United States Patent
Braunschweiler et al.

[11] Patent Number: 5,935,456
[45] Date of Patent: Aug. 10, 1999

[54] METHOD AND APPARATUS FOR ELECTROEROSIVE CUTTING

[75] Inventors: Andreas Braunschweiler, Locarno-Monti; Ivano Beltrami, Cavigliano, both of Switzerland

[73] Assignee: Agie SA, Lonsone, Switzerland

[21] Appl. No.: 08/827,669

[22] Filed: Apr. 10, 1997

[30] Foreign Application Priority Data

Apr. 10, 1996 [DE] Germany ............... 196 14 200

[51] Int. Cl.⁶ .................. B23H 1/00; B23H 7/06
[52] U.S. Cl. ............................................. 219/69.12
[58] Field of Search .................. 219/69.12, 69.13; 364/474.04

[56] References Cited

U.S. PATENT DOCUMENTS

| | | | |
|---|---|---|---|
| 4,499,359 | 2/1985 | Obara | 219/69.12 |
| 4,518,842 | 5/1985 | Obara | 219/69.12 |
| 4,520,253 | 5/1985 | Gamo et al. | 219/69.12 |
| 4,523,073 | 6/1985 | Gamo et al. | 219/69.12 |
| 4,546,227 | 10/1985 | Gamo et al. | 219/69.12 |
| 5,808,263 | 9/1998 | Beltrami | 219/69.12 |

*Primary Examiner*—Geoffrey S. Evans
*Attorney, Agent, or Firm*—Darby & Darby

[57] ABSTRACT

A method for moving a guide head of a wire erosion machine and possibly a workpiece along a guide path (TD), determining a drag error (S; $S_B$; $S_G$) of a wire electrode from making several drag error acquisitions or from a combination of several drag errors (S; $S_B$; $S_G$). Each drag error (S; $S_B$; $S_G$) is determined during one drag error acquisition. Also, a wire erosion machine is disclosed with an actuating device for effecting movements of at least a guide head and/or a workpiece, along a guide path (TD) including with several devices for determining a drag error (S; $S_B$; $S_G$) and a selection device for selecting the drag error (S; $S_B$; $S_G$) from one device or from a combination of drag errors (S; $S_B$; $S_G$) determined from several devices.

30 Claims, 5 Drawing Sheets

METHOD AND APPARATUS FOR ELECTROEROSIVE CUTTING

BACKGROUND OF THE INVENTION

1. Field of the Invention

The invention relates to a method for moving at least one guide head of a wire erosion machine, possibly a workpiece, along at least one guide path. The invention also relates to a wire erosion machine having an actuating device for executing movement of at least one guide head, possibly a workpiece, on at least one guide path. A machine or a method, respectively, of this type is known from U.S. Pat. No. 4,546,227 or from EP-0 068 027 B1.

Spark or electroerosion is a phenomenon wherein dielectric discharge occurs between two electrodes across a dielectic, resulting in a removal of material at one of the electrodes. This method is used since many years and increasingly for machining of metals since it permits fabrication of very concise contours. In respective machine tools, the so-called wire erosion machines, one electrode is formed by the workpiece, and the other electrode by a tool—called tool or die electrode. For attaining the desired contour, generally a numerically controlled relative motion between the workpiece and the two electrodes is provided. A flushing agent, usually water, which flows around the erosion zone under a certain settable flushing pressure serves as dielectric between two electrodes.

The electrode in a wire erosion machine is a cutting wire which is continuously unwound from a wire supply and guided via a first wire guide above the workpiece to the erosion zone and pulled from the erosion zone over a second wire guide below the workpiece into a receptacle for disposal. When a preset contour is to be cut in the workpiece, a precisely controlled relative motion between the cutting wire and the workpiece is required. The relative motion is usually realized by numerically controlling the movement of the workpiece and/or of the guide heads supporting the wire guides. This relative motion has to ensure that the erosion zone in the workpiece moves along a path—the contour curve—which follows the contour to be machined as accurately as possible.

Ideally if the cutting wire would travel in an exact straight line between the upper and lower wire guide, then the relative movement between the wire guide head and the workpiece would have to be matched, for example for a cylindrical cut, exactly the aforementioned contour curve. Although the wire is tensioned by drive and brake rolls in the guide heads, a certain bulging of the cutting wire opposite to the cutting direction cannot be avoided, which is caused, in particular, by the flushing and erosion pressure in the erosion zone. This bulging causes problems when the contour to be cut on the workpiece changes direction, especially at sharp curvatures or corners of the contour curve. This is the point where the so-called drag error manifests itself, which tends to flatten the contour curvature and to round the corners. This phenomenon is about comparable with the error between the tracks of a pulling and a pulled vehicle which can be observed when the vehicle rounds sharp corners.

2. Description of the Related Art

Different measures for compensating the drag error are known. For instance, U.S. Pat. No. 4,546,227 and EP-0 068 027 B1 disclose different methods whereby the bulging of the wire is measured by suitable position sensors while the erosion process is interrupted, and whereby control variables are calculated from the respective measured values which effect the above-described relative movement by minimizing the effects of the drag error. In U.S. Pat. No. 4,546,227 there is disclosed a method wherein for cutting a corner, the relative movement between the cutting wire and the workpiece is temporarily halted, and the drag error is measured. In EP-0 068 027 B1 there is described a method wherein two correction values are calculated from the measured wire bulging, with one of these correction values relating to the tangential and the other value to the radial component of the drag error at or near a curvature. These correction values are used to correct the relative motion of the advance system which was stored in a memory for the contour to be cut, by compensating the drag error. This means that the actual path which is effected by the advance system, of the relative movement between the wire guide heads and the workpiece is displaced—depending on the measured values for the wire positions—with respect to the contour curve to be cut.

Each of the two methods described above have different disadvantages, so that they cannot be employed universally. For instance, the first method described above which executes a edge strategy by reducing the erosion parameters, is very time consuming. The average cutting rate is reduced here depending on the radial content of the workpiece. For example, for a workpiece with a 15% radial content, only half of the maximum cutting rate is achieved.

With the above-described second method, the erosion speed does not have to be reduced because the guide path of the guide head is continuously corrected, thereby allowing the average cutting rate to be equal to the maximum cutting rate.

On the other hand, the decomposition of the drag error vector on an arc of a circle into the tangential and the radial component is static and independent of the direction of the drag error at the origin of the path element. There is no further correction provided upon return to a straight cut or at a transition from one straight cut to another straight cut. The static computation breaks down especially for small radii and for large changes in direction.

From EP-0 312 056 there is known a "sensor-supported" measuring device for a measuring the displacement of the wire electrode. The relative position between the guide head of the wire electrode and the workpiece can here be corrected in such a way that machining errors caused by the wire displacement can be prevented. This method has certain limitations which have to be taken into account by the operator. Especially under difficult operating conditions, i.e. if, for example, the contour to be cut is too close to the edge of the workpiece or contains cutting paths which are too close to each other, the measurement of the displacement can be unstable.

SUMMARY OF THE INVENTION

It is an object of the present invention to improve the drag error correction in wire erosion machines.

This object is attained by a generic method of the invention in that a drag error can be determined from several drag error acquisitions, and one drag error determined from a drag error acquisition or determined from a combination of several drag errors wherein each drag error is determined during one drag error acquisition, is selected. This object is also attained by an apparatus of the invention through several devices for measuring a drag error and a selection device for selecting the drag error from a device or for selecting the combination of measured drag errors from several devices.

According to the invention, in a wire erosion machine or in a method for moving the guide heads, possibly also the workpiece, there are provided several different devices and drag errors acquisition methods, so that one or several devices are selected or activated only if one or several of the other devices or drag error acquisition methods have reached their respective operational limit or are presently less suited for other reasons.

The devices for measuring the drag error and the drag errors acquisition methods, respectively, provide the values of a drag error using measured and/or calculated input values. The drag error values determined in this way correspond, depending on the operating conditions, more or less exactly the actual drag error values. With the invention, it is possible to considerably reduce the discrepancy between the actual and the determined drag error values in comparison to conventional wire erosion machines. In the wire erosion machine of the invention, this improvement is achieved by a controller capable of independently deciding and selecting which drag error acquisition method is under the current conditions most suited for correcting the wire position or the position of the workpiece, respectively—hereinafter referred to as correction strategy.

The wire erosion machine determines from the drag error data of the most suited correction strategy correction values for the guide path of the guide heads or the workpiece, respectively. The wire erosion machine or a correction system of the wire erosion machine can automatically switch from one correction strategy to another correction strategy, even during wire erosion machining. The transition from one correction strategy to another occurs within the set contour tolerances of each respective cut.

The correction system or an interpolator, respectively, also provides for a combination of different correction strategies. Correction values available are the measured values of a wire position sensor, a calculated or estimated value of a drag error and possibly the values from other strategies and a combination of these values.

The invention can also provide relief to an operator. For example, intervention by an operator is not required in order to switch from one correction strategy to another. In addition, machining is simplified and a combination of maximum safety—against faulty machining of the workpiece, especially under extreme machining conditions which could cause the disconnection of individual system components (such as wire position sensors) during the machining process—and maximum machining speed is achieved for all workpieces.

The conditions for making a selection include, for example, the stability of sensor signals, in particular from the wire position sensors, so that in a preferred method the selection is made by taking into account erosion parameters and/or at least one sensor signal. Accordingly, in a preferred wire erosion machine there are taken into consideration the selection device, the erosion parameters and/or at least one sensor signal. The contour to be cut can also influence the selection. Furthermore, the stability of the machining process is considered.

Erosion parameters are defined as those parameters which physically influence the removal of material in the erosion gap. Included in the erosion parameters are specifically the erosion voltage, the erosion current, the pulse frequency of the current and the voltage, respectively, the flushing pressure, the cutting speed and the erosion forces.

In a preferred embodiment of the method, the drag error is determined in a first drag error acquisition in form of a drag error vector, i.e. in form of a vector quantity from the erosion parameters currently governing the erosion process.

Accordingly, in a preferred wire erosion machine, a first device determines the drag error in form of a drag error vector, i.e. as a vector quantity, from the instantaneous erosion parameters governing the erosion process. This embodiment is based on the concept that the displacement required for correcting the drag error—the guide path correction—of the guide path to be followed by the wire erosion machine with respect to the contour curve to be cut can be represented by the magnitude and the direction of a drag error vector. Furthermore, these two components can be calculated from the instantaneous erosion parameters and from the known geometry of the contour to be cut, so that it is not necessary to use values measured by the wire position sensors.

Since the drag error is a vector quantity, its magnitude and direction can be separately considered and also separately calculated. The separation of magnitude and direction allows a simplified calculation of the drag error. Advantageously, the direction is determined exclusively from the geometry, while the magnitude is determined exclusively from the erosion parameters. The magnitude of the drag error is, on one hand, preferably determined during the first drag error acquisition or by the first device from the erosion current, the erosion voltage and/or the flushing pressure. On the other hand, the direction of the drag error, in particular the angle between the drag error vector and the tangent in/at a point x of the contour curve, is determined by the drag error acquisition method or by the first device, respectively, from the erosion parameters and/or from the geometry of the contour to be cut—represented by at least one contour curve—during the first drag error acquisition.

Preferably, from the first drag error acquisition, the instantaneous absolute value $|S_B(t)|$ of the drag error ($S_B$) is calculated by the drag error acquisition method or by the first device, respectively, from the instantaneous operating current i(t), from the instantaneous operating voltage u(t) and from the instantaneous flushing pressure p(t) according to the simplified formula $$|S_B(t)|=a*i(t)+b*p(t)+c*u(t)+d \qquad (1)$$

wherein a, b, c and d are predeterminable, in particular constant factors which can be determined experimentally or calculated from fixed parameters of the wire erosion machine and the workpiece. This formula shows the connection between the drag error value and the important erosion parameters current, voltage and flushing pressure. These erosion parameters are time-dependent, whereas the parameters a, b, c and d are preferably time-independent, although the parameters a, b, c and d may vary under certain conditions, in particular with time.

Preferably, in conjunction with the first drag error acquisition or by the first device, respectively, path elements of the contour curve are subdivided into segments, wherein for each new segment of successive segments δx, the angle δα is calculated according to the formula $$\delta\alpha(x)=(\pm 1/r_0-\alpha(x)/x_0)*\delta x, \qquad (2)$$

wherein x is the running length of the section to be cut next, $x_0$ is a parameter which can be predetermined either experimentally or calculated from fixed parameters of the wire erosion machine, and $1/r_0$ is the curvature of the contour curve, wherein $r_0$ and $x_0$ are calculated during the transition from the previous to the current path element. Particularly for complex contours, for example for curves with varying radii, the computerized numerical controller of the wire erosion machine subdivides the contours into small straight segments. Two adjacent segments are then displaced (at curvatures) with respect to their direction. In this way, however, only an approximate solution for each of the corrected guide paths is obtained. The accuracy of the approximation can, however, be optionally improved by decreasing the length of the segments.

Advantageously, in conjunction with the first drag error acquisition or by the first device, respectively, the angle $\alpha(x)$ between the drag error vector and the tangent at the point $x$ of the contour curve (UK), in particular if the contour curve is a sequence of arcs of a circle, is calculated approximately according to the formula $$\alpha(x)=\alpha_0+(\zeta_0-\alpha_\infty)*\exp(-x/x_0) \qquad (3)$$

wherein $\alpha_0$ is the angle between the drag error vector and the tangent of the new cutting direction and $\alpha_\infty$ is the asymptotic angle reached for $x>>x_0$. Here, in conjunction with the first drag error acquisition or by the first device, respectively, the parameter $x_0$ is determined from the relation $$\alpha_\infty=x_0/r_0 \qquad (4)$$

The direction of the vector is calculated from the angle obtained from the direction of the segment cut last (path element or segment) on the contour curve and the direction of the segment to be cut next (path element or segment) on the contour curve.

The formulas above contain, aside from the indicated quantities, only those parameters which depend on fixed parameters of the machine and known parameters of the workpiece and which can be determined experimentally or calculated from those parameters and entered when the workpiece is prepared for machining, for example in the software for the computerized numerical control (CNC) of the wire erosion machine.

In a preferred method, the relative position of the cutting wire with respect to the guide heads is measured by a second drag error acquisition, taking into consideration the at least one sensor signal. Accordingly, in a preferred wire erosion machine, a second device comprises a sensor device for measuring the relative position of the cutting wire with respect to the guide heads for generating at least one sensor signal. The measurement is performed, for example, with an opto-electronic system which measures the wire position with an optical light waveguide sensor. The actual wire position is measured biaxially in real time with a resolution of about 1 $\mu$m. The sensor is connected directly to a numerical control and determines, for example, 30 times per second the deviation between the measured wire position and the programmed contour. Subsequently, the respective correction of the guide path is calculated from the deviation of the wire position while the step size is maintained. Since the correction is performed continuously, the erosion speed does not have to be reduced which makes the process very efficient.

In a particularly preferred method, at least one corrected guide path is determined with the help of the selected drag error or the selected combination of drag errors, respectively, and/or the geometry of the contour curve. On the other hand, the selection device supplies the drag error governing the erosion process to an interpolator and the interpolator determines the corrected guide path based on the drag error and/or the geometry of the contour curve. The interpolator receives either the detected drag error from a device or a combination of several detected drag errors and calculates or interpolates, respectively, from this drag error or these drag errors new nominal coordinates for the guide head(s) or the workpiece, respectively, taking into consideration the geometry of the contour to be cut. These nominal coordinates are subsequently conveyed to the respective actuating device which in turn moves the guide head(s) and/or the workpiece into the new position.

Preferably, the cutting speed is reduced when difficult operating conditions are encountered, wherein the reduction is accomplished by a numerical controller. Such operating conditions encountered during cutting can be, for example, corners with very small angles, i.e. very pointed corners. In such situations, it is advantageous to increase the accuracy by reducing the cutting speed. These additional measures are particularly recommended for very pointed corners which generally require a high precision.

In a preferred method, the drag error determined during the first drag error acquisition is selected if the sensor signal meets certain conditions, in particular, if the sensor signal reaches a preset limit value with respect to oscillations, variance or standard deviation, to changes per unit time and/or to the absolute value of the sensor signal. Correspondingly, in a preferred wire erosion machine, the selection device is connected to the second device in such a way that the drag error generated by the first device is connected through by the selection device switches as soon as the sensor signal meets the aforementioned criteria.

If a sensor malfunctions or is damaged or misadjusted, for example as a result of a collision between the sensor and the workpiece, the expected sensor signals can change. These changes can be registered by suitable monitoring, and a different correction strategy can then be employed. The sensor signals are monitored with respect to possible signal changes which manifest themselves in the form of oscillations. The severity of these oscillations can be determined from the variance or standard deviation of the sensor signal. The sensor signal is also monitored with respect to variations with time and to its absolute value. If a specific limit value is exceeded or lagged behind, the sensor may be malfunctioning, and is recommended to switch in this case to a different correction strategy.

In a preferred method, the measured drag errors are weighted differently if a combination of several measured drag errors is selected. As mentioned above, the wire erosion machine can take into consideration several guide path corrections and correction strategies, respectively, making it possible to combine several corrections and correction strategies. In particular, the weight of correction values of one particular correction strategy can be decreased, if a signal analysis determines that certain assemblies and system components, respectively, may be malfunctioning. By weighting differently obtained drag errors differently, a different reliability of the measured drag error errors can also be taken into account. In addition, singular "excursions" of individual values can be smoothed by a weighted averaging method.

In a preferred wire erosion machine, the first and/or second device, the selection device and/or the interpolator are realized by implementing respective computer programs in one or several computer device(s). Such "software" solution makes it possible to construct a wire erosion machine with a smaller number of system components. The cost of the wire erosion machine is thereby reduced and the maintenance of the machine simplified.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 2a perspective view of a workpiece and the cutting wire during the machining operation;

DETAILED DESCRIPTION OF THE PRESENTLY PREFERRED EMBODIMENTS

In the following description, a certain terminology will be used for making it easier to read the specification, without, however, limiting its scope. For example, the terms "above" and "below", "vertical", etc., relate to the typical operating position and sized of wire erosion machines and to workpieces arranged in conventional fashion. Furthermore, the scale in the Figures is only given for illustrative purposes. In addition, numerical values "x" are to be understood as "at least x" and only preferably in the sense of "exactly x."

In the Figures, functionally equivalent elements generally have identical reference numbers.

Figure 1:
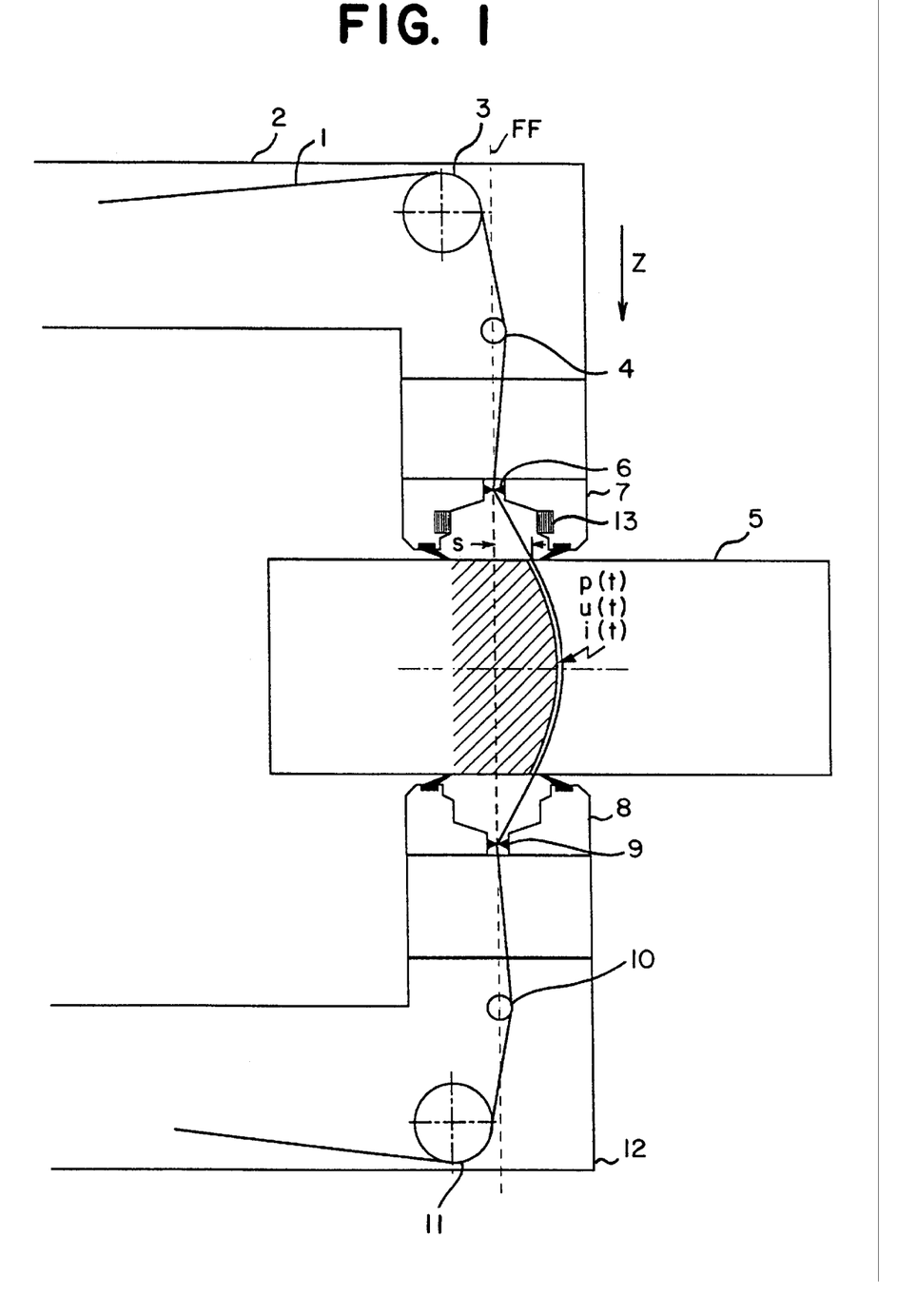
FIG. 1 is a schematic view of the construction of a wire erosion machine.
Figure 2:
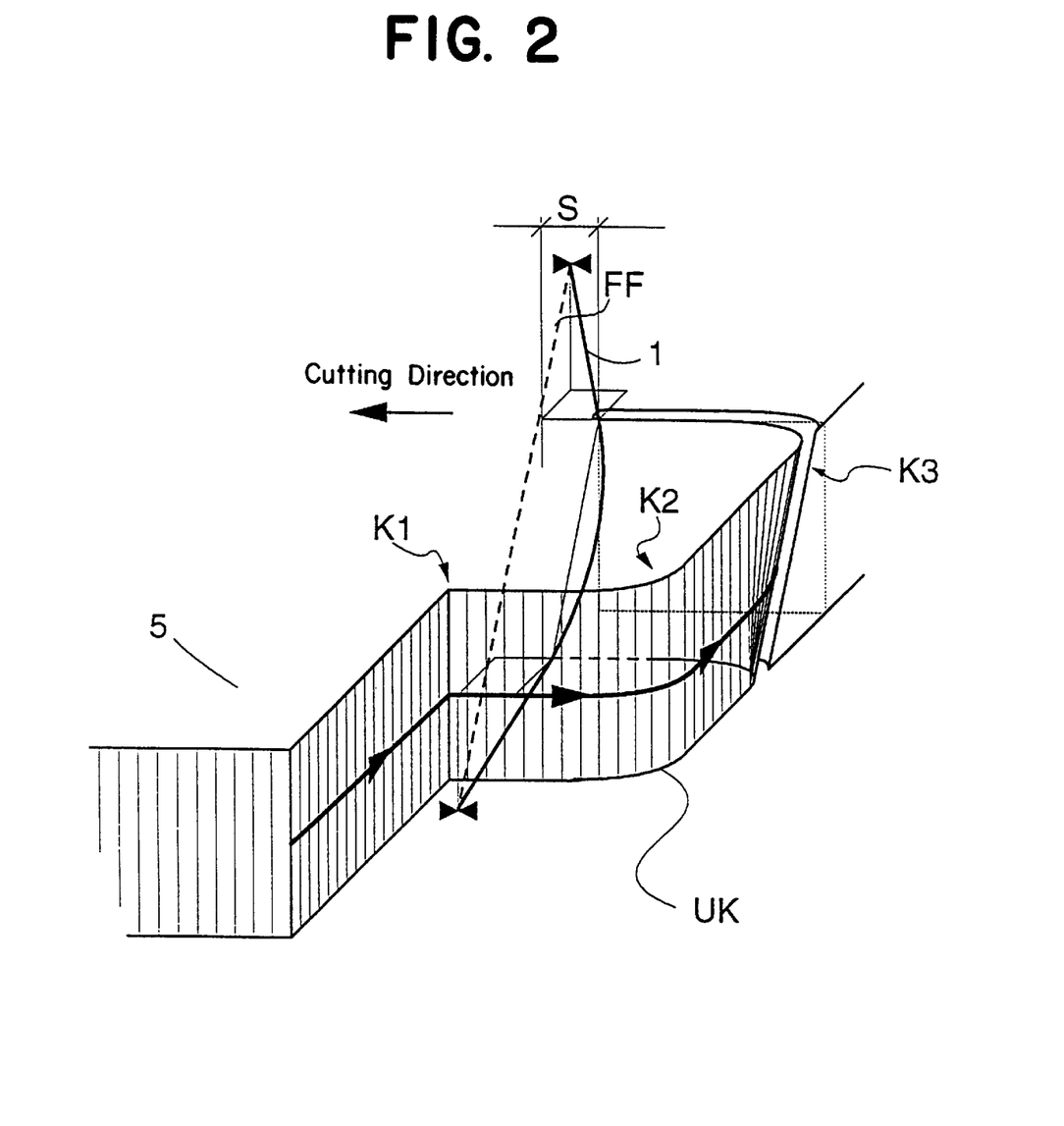
Figure 3:
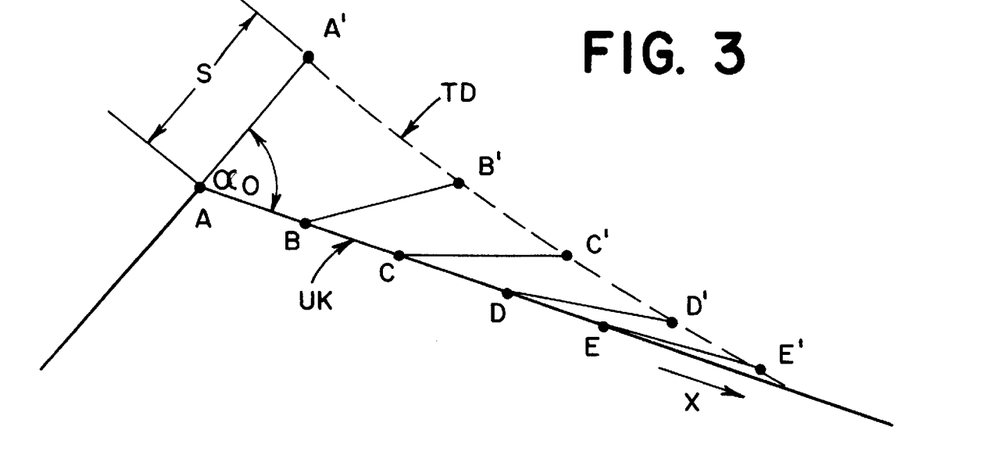
FIG. 3 the change in the drag error vector during cutting of an edge.
Figure 4:
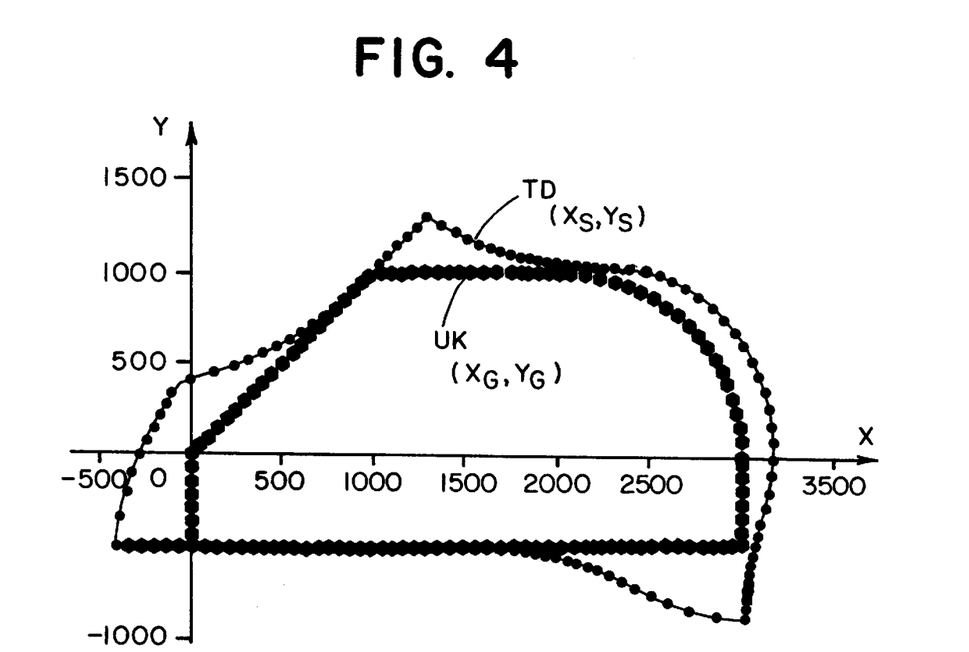
FIG. 4 as an example, a typical course of a wire guide path in comparison to a contour curve to be cut.

In FIG. 1, there is first described the general construction of a wire erosion machine. In FIGS. 2 to 4, there is described the drag error resulting from the bulging of the cutting wire and the corresponding wire guide path (guide path of a guide head). Based on the foregoing, FIG. 5 describes a method and an apparatus, respectively, according to the invention for selecting a measured drag error or a combination of several differently measured drag errors for correcting the position of the cutting wire or a workpiece, respectively, for reducing the contour error caused by the drag error.

FIG. 1 depicts schematically only those elements of a wire erosion machine which need to be referred to for describing the invention. Basic elements, such as flushing systems and generator, are not shown since they are considered obvious and are generally known.

An erosion or cutting wire 1 supplied with electric pulses during erosion cutting is wound in the wire transport direction indicated by an arrow Z from above to below. The cutting wire 1 which is unwound from a supply spool (not shown) initially turns around several deflection means located on an upper machine arm 2, with only one deflection pulley 3 shown. The cutting wire 1 then turns around a current feed 4 adapted to supply, in a conventional manner, the electrical pulses generated by the generator of the machine. The current feed 4 also provides a certain tension to the cutting wire 1. When viewed in the wire transport direction Z, there is disposed after the current feed 4, above the workpiece 5 to be cut, an upper wire guide 6 which is located in an upper guide head 7. Alternatively (not shown), several upper wire guides may be provided instead of a single upper wire guide 6.

Behind or under the workpiece 5, there is located a second guide head 8 with another lower wire guide 9. Again, alternatively (not shown), several lower wire guides may be provided instead of a single lower wire guide 9. After passing through the workpiece 5, the cutting wire 1 travels, in that order, to the lower wire guide 9, to a lower current feed 10 corresponding to the upper current feed 4, and a deflection pulley 11 secured to a lower machine arm 12, before being conveyed to a disposal container (not shown). A flushing device (not shown) ensures the cutting wire 1 in the workpiece 5 is continuously coaxially flushed by a pressurized flushing agent.

Usually, the workpiece 5 and/or the lower guide head 8 are guided two-dimensionally (in the so-called X and Y direction) along a wire guide path in order to cut a certain contour from the workpiece 5. In order to achieve a conical cut, the upper guide head 7 is usually guided relative to the lower guide head 8 or to the workpiece 5, respectively, in the U and V direction. In particular in special wire erosion machines, the lower guide head 8 is not moveable, whereas the workpiece 5 and the upper guide head 7 can be moved independent of each other.

The following embodiment describes a wire erosion machine with guided upper and lower guide head and stationary workpiece. Consequently, in the description of the present embodiment, other known methods for guiding or tilting the individual guide heads 7 and 8, the workpiece 5, etc., are not discussed in further detail, e.g. with respect to the selection of a drag error for correcting the position of the cutting wire or the workpiece. This is not to be construed as a limitation, but is intended solely for providing clarity to the description. The respective applicable drag error selection can be applied similarly to all these methods, if the underlying geometry is properly taken into consideration.

As described above, the cutting wire 1 bows or bulges during electroerosive cutting of full cuts in the direction opposite to the cutting direction. During trim cuts, bulging can also occur perpendicular to the cutting direction. Bulging in the direction opposite to the cutting direction is shown in FIG. 1 for the situation where the cutting direction in the drawing plane points from left to right. In this case, the cutting wire 1 bulges to the right. The width S of the bulge is defined here as the distance between the actual wire position at the entrance and the exit of the workpiece, and a straight wire guide line FF connecting the points where the cutting wire 1 contacts the wire guides 6 and 9, respectively.

FIG. 2 shows, as an example, a cut made on the workpiece 5. The cutting wire 1 is shown in a situation where is has already passed several sections of the cut. The first section is cut cylindrically and extends to an edge or a corner K1. The second section extends from there on to a curvature K2 and is also cut cylindrically. The third section extends further to a curvature K3 with a conical cutting surface, with the conicity changing from a cylindrical to a conical cut. All sections, with exception of the conical section, are oriented vertically, i.e. their surface lines, shown in FIG. 2 as thin hatched lines, extend vertically through the workpiece 1. In the conically cut curvature K3, the surface lines run obliquely with respect to the vertical. A thick line with an arrow, which extends through the center of the surface lines in FIG. 2, indicates the cutting direction.

For a cylindrical cut, ideally—i.e. if the cutting wire 1 had no bulge, but would correspond exactly to the straight wire guide line FF—the desired contour would be achieved if the guide heads were guided in the X and Y direction along a wire guide path which corresponds exactly to a contour curve UK of the contour to be cut on the surface of the workpiece. For a conical cut the wire guide path of the lower guide head 8 deviates from the contour curve UK of the contour to be cut on the lower surface of the workpiece, independent of the additional relative U and V movement of the upper guide head 7 with respect to the lower guide head 8.

As a result of the unavoidable bulging of the wire, however, the straight wire guide line FF is never located at the actual erosion zone, but is displaced by the bulge width S. This causes, in particular near corners and contour curvatures, the abovedescribed drag errors. For compensating the drag errors, the wire guide path has to be corrected such that the wire is always located on the desired contour, meaning according to the formula:

$$F(x)=F_0(x)+S(x) \qquad (5)$$

Herein

F(x) corrected position of the guide heads (wire guide path), $F_0(x)$ originally desired contour, and S(x) calculated drag error correction.

F(x), $F_0(x)$ and S(x) in formula (5) represent, in particular, vector quantities depending on the position x. Formula (5), however, can also be written as a function of time.

It is therefore an important feature that it is possible to calculate the magnitude of the drag error as well as the direction of the drag error as a function of the actual erosion conditions and to correct the position of the guide heads in real time with the formula (5).

The quantity S(t), i.e. the drag error as a function of time, can also be interpreted such that S(t) always—i.e. not only for straight cuts, but also for edges and curvatures—indicates the necessary distance which has to be maintained between the corrected wire guide path TD and the instantaneous erosion zone along the contour curve UK. For compensating the drag error, there can at any time also be defined a vector, wherein the instantaneous magnitude of the vector corresponds to the respective width S(t) and the instantaneous direction of the vector points from a point of the contour curve UK to the associated point of the corrected wire guide path TD. The vector therefore provides all information required for determining the corrected wire guide path TD from the contour curve UK.

FIG. 3 elucidates this situation, taking as a first example the cylindrical cut of a corner. The thick line represents the contour curve UK of the contour to be cut on the surface of the workpiece. If a cylindrical cut were possible without drag error, then the contour curve UK would be identical to the wire guide path of the guide heads 7, 8. As a result of the (unavoidable) drag error, the wire guide path has to be corrected accordingly. Because the cutting wire 1 bulges by a distance S, the guide heads 7, 8 should advance in front of the location of the erosion zone by the length S in the cutting direction along the corrected wire guide path TD during the cut of the straight section before the corner A. It has been observed that the length S depends essentially linearly on the power consumed during erosion, meaning on the instantaneous value of the operating current—i.e. the average value at any given time of the current flowing in the erosion zone—, on the instantaneous value of the erosion voltage, on the pressure from the gas bubble formed in the plasma channel, subsequently called erosion pressure, on the flushing pressure, as well as on parameters which do not vary during the machining process or which cannot be predicted (wire diameter, wire type, height of the workpiece, type of material, etc.). A sequence of appropriate technical measurements can determine the relationship between the length S and the wire erosion machine, the workpiece 5, possibly the contour and the environmental conditions, with the required precision. This means that during each machining operation, the value S can be calculated instantaneously (e.g. every millisecond), by using only the signals representing the instantaneous operating current, the instantaneous operating voltage of the erosion and the flushing pressure. An empirically obtained formula for describing the instantaneous value S(t) with sufficient accuracy, is:

$$S(t)=a*i(t)+b*p(t)+c*u(t)+d \qquad (6)$$

wherein the symbol * denotes multiplication, i(t) the instantaneous operating current, u(t) the instantaneous operating voltage and p(t) the instantaneous flushing pressure; a, b, c, and d are prefactors which depend essentially on the fixed or predeterminable parameters mentioned above and which are essentially constant during an erosion process. These prefactors can be determined experimentally and/or at least partly calculated from the aforementioned parameters and entered into the computer of the numerical controller (CNC) of the wire erosion machine in preparation for machining the workpiece.

FIG. 3 shows a contour to be cut, or more precise, a desired contour curve UK, including a corner where the cutting direction changes abruptly by an angle $\alpha_0$. When the corner A is reached, the wire guide or wire guides, respectively, are located at the point A' of the wire guide path TD. The vector A-A' has, as described above, the magnitude S and forms the angle $\alpha_0$ with the direction to be cut after the corner. The angle $\alpha_0$ is preset by the geometry of the contour curve to be cut. In order to continue the subsequent cut according to the contour curve UK through the points A, B, C . . . which are located on a straight line, the vector is gradually rotated from the previous cutting direction into the new cutting direction, preferably without changing its magnitude S(t). This means that the angle $\alpha(x)$ formed between the vector and the new cutting direction, decreases with increasing length of the new section. As a result, the wire guide path TD follows the points A', B', C' . . . etc. It has been found that the vector angle $\alpha(x)$ decreases exponentially with respect to the position of the new straight cutting line according to the formula:

$$\alpha(x)=\alpha_0*\exp(-x/x_0), \qquad (7)$$

wherein $x_0$ is the "half value distance" of the rotation of the drag error vector, i.e. the distance required for the drag error vector to rotate by half of the required change in direction. The "half value distance" depends mainly on the fixed parameters of the machine. The fact that the angle $\alpha(x)$ decreases exponentially, proves that the friction created by the curvature of the cutting wire is proportional to rate of change in the vector direction.

The parameter $x_0$ can be predetermined experimentally, similar to the constants a, b, c and d described above, or can be calculated from fixed parameters of the machine and entered into a memory 50 of the machine. If $\alpha_0$ is large, i.e.

when the change in direction of the contour to be cut is large, then the value $x_0$ is somewhat dependent on $\alpha_0$ which is mainly caused by the fact that the wire curvature offers resistance to a change in the cutting direction. This dependence can also be predetermined and entered in the software of the apparatus.

Figure 3A:
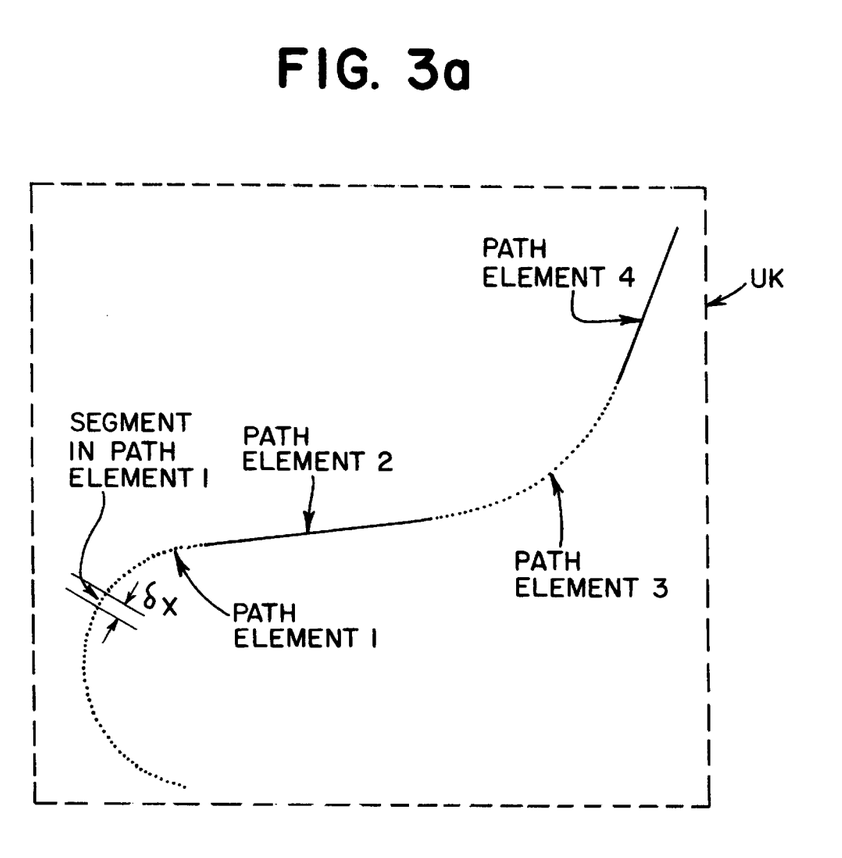
FIG. 3a schematically, the subdivision of a contour curve to be cut into path elements and segments.

It is evident from the derivative $$d\alpha/dx=-\alpha_0/x_0*\exp(-x/x_0) \qquad (8)$$

that if a path element to be cut according to FIG. 3a is subdivided in segments with the length $\delta x$, then the change in direction of the vector can be calculated for each segment according to the formula:

$$\delta\alpha(x)=-\alpha(x)/x_0*\delta x. \qquad (9)$$

Figure 3B:
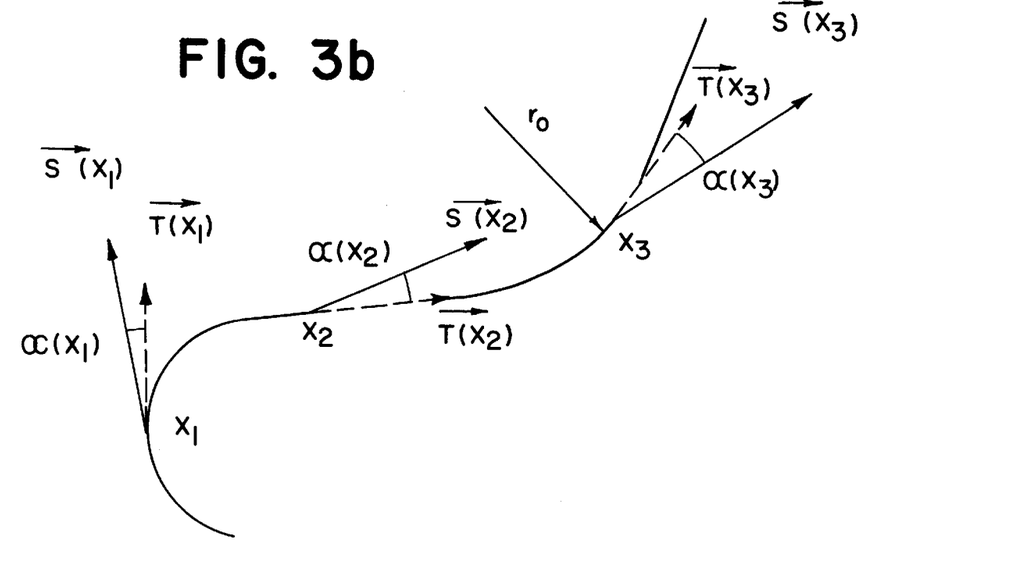
FIG. 3b tangents and drag error vectors on a contour curve to be cut.

The change of direction or "rotation" of the vector is calculated for each path segment $\delta x$ using formula (9). This algorithm can easily be generalized to apply to each contour curve UK by taking into account the instantaneous curvature $1/r_0(x)$ of the contour curve at point x. In this case, $\alpha(x)$ is the angle between the vector at point x and the cutting direction given by the tangent at point x. This is shown in FIG. 3b. A new term describing the rotation of the tangent over the distance $\delta x$, namely $\delta x/r_0(x)$, has to be added for describing the change in the angle $\delta\alpha(x)$. The general form of formula (9) then becomes:

$$\delta\alpha(x)=(\pm 1/r_0(x)-\alpha(x)/x_0)*\delta x, \qquad (10)$$

wherein the "+" sign applies when the contour curve moves away from the instantaneous direction of the drag error, and the "−" sign applies in the opposite case.

Integration of formula (10) for segment-wise constants $r_0$ and $x_0$ result in the more general form of formula (7) for the situation where the contour curve is a sequence of arcs of a circle (a straight line is an arc of a circle with a radius $r_0=\infty$) which is almost always the case for a realistic contour curve. As a result:

$$\alpha(x)=\alpha_\infty+(\alpha_0-\alpha_\infty)*\exp(-x/x_0), \qquad (11)$$

wherein $\alpha_0$ is the angle between the drag error vector and the tangent of the new cutting direction at the origin of a new path element (arc of a circle) and $\alpha_\infty$ the asymptotic angle a reached for $x>>x_0$ if the arc is sufficiently long. For the stationary case, $\delta\alpha=0$, and from formula (10) follows the relationship:

$$\alpha_\infty=x_0/r_0, \qquad (12)$$

which is very useful for determining $x_0$.

The magnitude of the drag error is, as described above, basically independent of the geometry of the contour curve. However, a small correction has to be applied for large changes in the cutting direction, for example for $\alpha_0>90°$, since under those conditions the component of the directional change of the drag error vector $\delta S$ along the previous cutting direction is indeed negative. In order to prevent the wire from eroding too deeply into the workpiece, it is necessary to reduce the magnitude S temporarily according to the following formula:

$$S(x)=S_0*(1-f*\sin(g*x/x_0)*\exp(x/x_0)). \qquad (13)$$

Here, $S_0$ indicates the drag error before the change in direction. The parameters f and g are, among others, dependent on the change in cutting direction, the cutting speed, possibly also the erosion parameters and the materials used.

Formula (13) describes an oscillation of the magnitude of the drag error which is only noticeable (or measurable) for large changes in direction and which is reduced exponentially within the half value distance $x_0$.

In a second example, FIG. 4 shows the application of the above algorithm to a contour to be cut—represented by a contour curve UK—wherein the rectangular points on the contour curve UK represent discrete locations; the Cartesian coordinates of these points will be called $x_0$ and $y_0$. The round points represent discrete values along the corrected wire guide path TD, corresponding to the set coordinates $x_s$ and $y_s$ for one or more wire guide head(s). The numbers indicated on the coordinate system have dimensions in $\mu m$. In the present example, the magnitude of the drag error vector is taken as 400 $\mu m$; this is for illustrative purposes only.

The method and apparatus, respectively, of the invention can be used for practically arbitrary contours, in particular also for conical cuts. During a conical cut, the cutting wire 1 tilts—in addition to its tilt with respect to the vertical direction through the workpiece 5—mostly in the cutting direction as a result of the drag error. Consequently, the cutting wire 1 is oriented—both above and below the workpiece 5—at a certain tilt angle in relation to the straight wire guide line FF. These two tilt angles correlate with the magnitude of the drag error above the workpiece and below the workpiece and are essentially proportional to the cutting speed and the flushing pressure. The tilt angles above the workpiece and below the workpiece 5 are therefore identical in first approximation; at a higher relative speed of the two guide heads 7 and 8, however, the tilt angles can deviate from each other by up to 15%. This deviation can be corrected in second approximation by taking into account the relative speeds.

For each coordinate pair $x_0$, $y_0$ of the contour curve UK, there can be calculated with the aforedescribed method a respective set coordinate pair $x_s$, $y_s$ for the position of the lower guide head 8 and/or a respective coordinate pair for the upper guide head 7. The actuating device of the machine can then be controlled based on this calculation, taking into account the respective instantaneous erosion parameters i(t), u(t) and p(t), without the need to rely on measured values from any wire position sensors.

The quality of the method also relies on the completeness of the data base used for determining the abovedescribed parameters a, b, c, d, $x_0$ as a function of the machine parameters (wire diameter, height of the workpiece, . . . ). A high-quality, highly automated erosion machine is capable of intelligently combining the different methods, especially sensor-supported and "software-supported" methods, in the sense that almost all disadvantages of one method can be surmounted by the other method. Although the different methods basically represent independent solutions, the combination of the methods makes it possible to eliminate all practical limitations to their application.

The first device can preferably be built into a wire erosion machine which includes other devices for determining the drag error, in particular a second device operating on the basis of signals from one or more wire position sensors. It is feasible, by making a very specific selection, to optimize machining of the workpiece 5 with respect to maximum safety and maximum machining speed. In addition, complex geometries with contour curve UK which are difficult to cut, can be cut automatically without intervention from the operator with maximum reliability and precision.

Under difficult erosion conditions, for example when pointed angles under 20° inside the contour to be eroded, the cutting speed can be temporarily reduced in addition and independent of the method employed; in both cases, the magnitude of the drag error is immediately adjusted.

Figure 5:
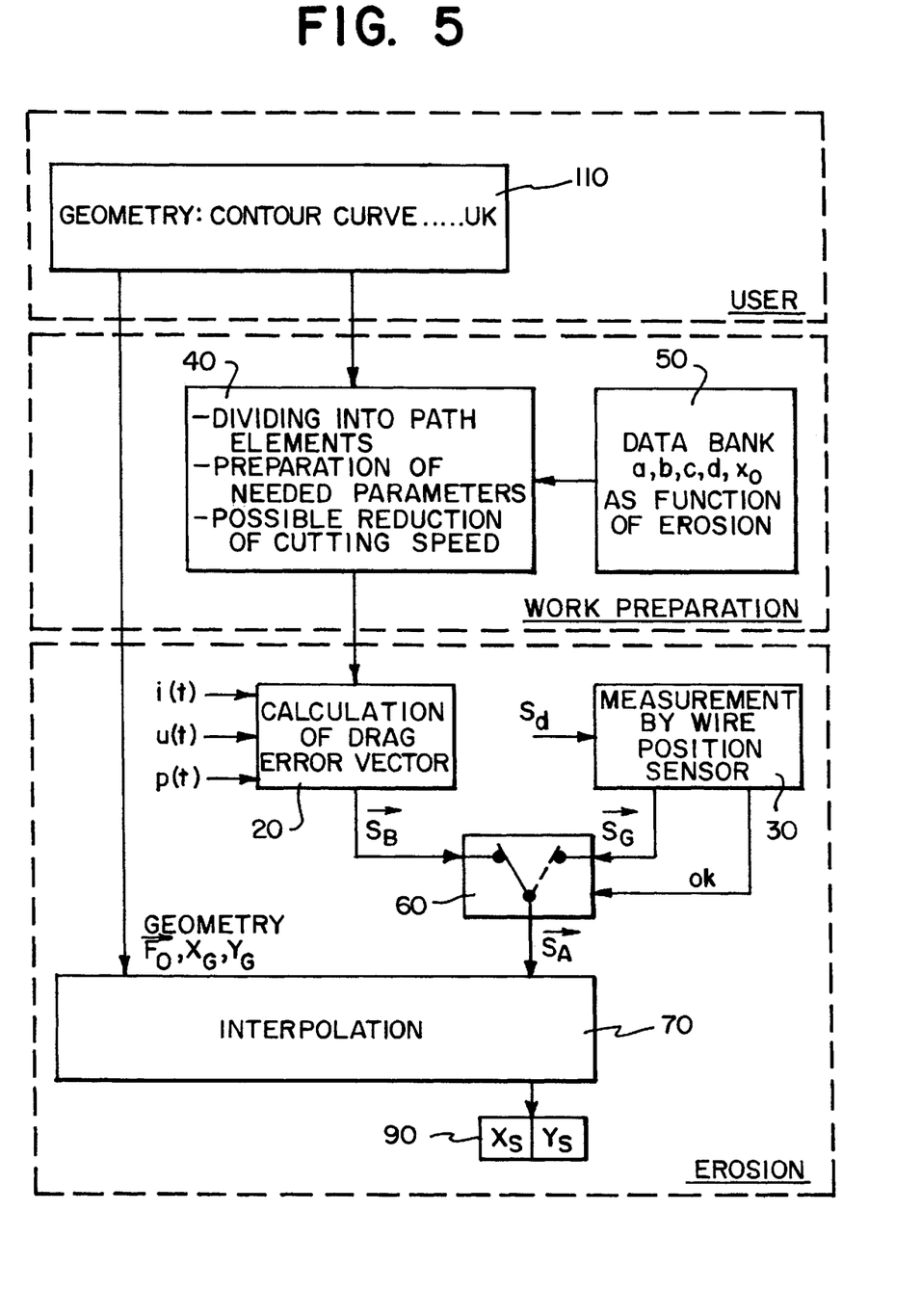
FIG. 5 a block diagram of a control system for correcting the drag error in a wire erosion machine according to an embodiment of the invention.

Referring now to FIG. 5, the is described an embodiment for a respective combination of two devices for determining the drag error, together with measures for intelligently selecting the device to be used, wherein the selection can be made without the assistance or intervention of the operator. This has the advantage that no special know-how is required from the operator who need only set the final geometry and the desired accuracy and smoothness. This method is indicated in FIG. 5 by the reference numeral 110. This method significantly enhances the safety margin for obtaining a desired final geometry in the desired form—as compared to a conventional machining process—by having two independent control devices 20 and 30 for calculating and measuring the drag error.

The numerical controller 40 subdivides the contour curve in path segments (mostly arcs of a circle) and prepares all required parameters with the help of a data base 50. The numerical controller can adjust the nominal speed taking into account the geometry, if particularly difficult operating conditions are present, without having to change anything else in the entire control system. The correction system calculates or measures the new magnitude of the drag error accordingly. The corrected final geometry TD of the guide heads is calculated by an interpolator 70.

The operating safety and precision can be increased by installing a wire position sensor 30. In this case, two methods and devices, respectively, are available for determining the drag error, which basically provide two similar signals $S_G$ and $S_B$.

The first device 20 receives the time-dependent erosion parameters i(t), u(t) and p(t) and includes computing means for determining the magnitude and the direction of the drag error vector according to the algorithms in the above formulas. These values of the drag error vector are conveyed to a signal input of a selection device 60, symbolically represented by a switch symbol. From an associated output of the selection device 60, the correction values are conveyed to an input of the interpolator 70, where they are linked with coordinate values $x_0$, $y_0$ of the contour curve to be cut for obtaining corrected nominal coordinates $x_s$, $y_s$ for the guide heads.

In the embodiment illustrated in FIG. 5, there is provided aside from the first device 20 a second device 30 for receiving at least one sensor signal $s_d$ of at least one wire position sensor which is schematically shown in FIG. 1 with the reference numeral 13. For example, a device of the type disclosed in EP-0 312 056 A1 can be used as wire position sensor 13. The second device 30 determines from the sensor signal(s) $s_d$ the bulging of the cutting wire 1 and derives therefrom respective values of the drag error vector $S_B$. The values of the drag error vector $S_G$ which are supplied by the second device 30, can be conveyed, either alternatively or in common with the values $S_B$ supplied by the first device 20, via the selection device 60 to the interpolator 70 where the respective values are processed in similar fashion as described in conjunction with the first device 20. If the values $S_G$ and $S_D$ are supplied together to the interpolator 70, then the interpolator 70 can derive an averaged correction value, for example by averaging or other methods.

The following procedure can be used for the final determination of the corrected wire guide path TD:
Under the assumption that the measurement conditions are optimized and the measurement accuracy is sufficient, the path is corrected with the signal $S_G$ from the wire position sensor 20.

Simultaneously, the first device 20 calculates the drag error vector $S_B$ with the help of instantaneous values i(t), u(t), p(t).

The cutting speed is reduced when the difference between the two signals $\Delta S = S_G - S_B$ exceeds a certain value The second device 30 monitors variations in the sensor signals, e.g. by calculating the variance over a certain time period. If the variance exceeds a certain value or is equal to 0, i.e. the wire position sensor is not functioning, the controller 30 signals this faulty situation to the selection device 60 which subsequently switches—according to a specific algorithm—to use the signal $S_B$.

As an alternative to the above procedure, it is advantageous for specific machining tasks to use the signal $S_B$ as the main signal and to use $S_G$ as an additional sensor for monitoring possible vibrations of the wire.

The selection device 60 is supposed to decide in real time which procedure for determining the drag error makes the most sense, either the first essentially sensor-independent determination of the drag error with the help of the first device 20 or the second sensor-supported determination of the drag error with the help of the second device 30 or a combination of the two corrections. The decision should be made on the basis of several criteria, in particular the signal stability of the wire position sensor 13 and the second device, respectively, the process stability and the contour geometry.

The at least one sensor signal $s_d$ is continuously monitored for determining possible instabilities. The selection device 60 selects the drag error values $S_B$ supplied by the first device 20 if the sensor signal $s_d$ satisfies at least one of the following criteria:

1. The absolute value of the sensor signal $s_d$ exceeds or stays below a preset limit value.
2. The oscillations of the sensor signal $s_d$—i.e. the vibration of the cutting wire 1—exceed or stay below a preset limit amplitude, which can be determined, for example, via the standard deviation or the variance of the sensor signal $s_d$.
3. The change in the sensor signal $s_d$ per unit time exceeds a preset limit value.

If the first or third criterion is satisfied, this may indicate an undesirable performance of the wire position sensor 13, so that the first device has to take over. It can also happen that the wire position sensor 13 does not respond at all. This situation can be included by selecting the first device based on a forth criterion:

4. During a test phase before the start of the erosion, possible variations in the sensor signal $s_d$ are detected by increasing the flushing pressure (e.g. from 0 to 18 bar).

Signal variations of a wire position sensor 13 during pressure rise can occur, for example, as a result of a previous operating malfunction of the wire erosion machine (collision) which caused damage to the sensor.

The functions of the devices 20 and 30 as well as the functions of the selection device 60 and of the interpolator 70 may be performed at least in part by a common computer or by separate processors.

The apparatus described above makes it possible to change the method used for determining the drag error and thereby also the drag error correction during machining of the workpiece. The change from one of the devices 20, 30 to the other (e.g. from the second device 30 to the first device 20 and vice versa) is accomplished by transitions located inside the preset contour tolerance of the respective cut.

In the following, two embodiments will be described for operating the wire erosion machine with a change between different methods for determining the drag error:

Embodiment 1
Software-Supported Correction

The selection device 60 conveys the calculated signal $S_B$ to the interpolator 70. The wire position sensor or the second device 30, respectively, are used for monitoring the wire movement.

If the oscillations of the wire (standard deviation of the sensor signal $s_d$) exceed a certain value, or the difference between the two signals $$|\vec{\Delta S}| = |\vec{S_G} - \vec{S_B}|$$

exceeds a certain value, then the cutting speed is reduced until the aforementioned criteria are satisfied.

Embodiment 2
Sensor-Supported Correction

The signal $S_G$ of the wire position sensor is used as the main signal and conveyed from the selection device 60 to the interpolator.

If the oscillations of the wire (standard deviation of the sensor signal $s_d$) exceed a certain value, or the difference between the two signals $$|\vec{\Delta S}| = |\vec{S_G} - \vec{S_B}|$$

exceeds a certain value, then the controller 50 signals this erroneous situation to the selection device 60 which subsequently selects and applies a certain algorithm for using the signal $S_B$.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for correcting a movement of at least one guide head guiding a wire electrode of a wire erosion machine along at least one guide path (TD) for cutting a workpiece, comprising the steps of:

a) determining a drag error (S; $S_B$; $S_G$) of the wire electrode through a plurality of drag error acquisitions;

b) selecting from the plurality of drag error acquisitions the drag error (S; $S_B$; $S_G$); and c) correcting the movement of the at least one guide head with the selected drag error.

2. The method according to claim 1, further comprising the step of considering in the selection step at least one erosion parameter present during an erosion process and a sensor signal ($s_d$).

3. The method according to claim 2, wherein the drag error is determined by a vector quantity from the at least one erosion parameter present during the erosion process.

4. The method according to claim 2, wherein in the plurality of drag error acquisition, the drag error is selected by determining the magnitude of the drag error ($S_B$) from at least one of erosion current (I(t)), erosion voltage (u(t)) and the flushing pressure (p(t)).

5. The method according to claim 3, further comprising the step of determining the direction of the drag error ($S_B$), an angle $\alpha(x)$ between the drag error vector and a tangent at a point x of a contour curve (UK) during the drag error acquisition, from the at least one erosion parameter and from the geometry of a contour to be cut, represented by at least one contour curve (UK).

6. The method according to claim 5, wherein from the drag error acquisition, an instantaneous absolute value $|S_B(t)|$ of the drag error ($S_B$) is calculated from an instantaneous operating current I(t), an instantaneous operating voltage u(t) and an instantaneous flushing pressure p(t) according to the simplified formula $$|S_B(t)| = a*I(t) + b*p(t) + c*u(t) + d,$$

wherein a, b, c and d are predeterminable, constant factors and determinable by at least one of experimentation and calculation from fixed parameters of the wire erosion machine and the workpiece.

7. The method according to claim 5, wherein the contour curve (UK) has path elements and further comprising the step of subdividing the path elements into segments, wherein for each segment of successive segments δx the angle δα is calculated according to the formula $$\delta\alpha(x) = (\pm 1/r_0 - \alpha(x)/x_0)*\delta x,$$

wherein x is the running length of the section to be cut next, $x_0$ is a parameter which can be predetermined either experimentally or calculated from fixed parameters of the wire erosion machine, and $1/r_0$ is a curvature of the contour curve (UK), and wherein $r_0$ and $x_0$ are calculated during the transition between the previous and the current path element.

8. The method according to claim 7, further comprising the step of calculating the angle $\alpha(x)$ between the drag error vector and the tangent at the point x of the contour curve (UK) according to the formula $$\alpha(x) = \alpha_0 + (\alpha_0 - \alpha_\infty)*\exp(-x/x_0),$$

wherein $\alpha_0$ is the angle between the drag error vector and the tangent of the new cutting direction and $\alpha_\infty$ is an asymptotic angle reached for $x \gg x_0$.

9. The method according to claim 8, wherein $x_0$ is determined from the relation $$\alpha_\infty = x_0/r_0.$$

10. The method according to claim 2, further comprising the step of measuring the relative position of the wire electrode with respect to the guide heads by a second drag error acquisition, taking into consideration the sensor signal ($s_d$).

11. The method according to claim 10, further comprising the step of determining at least one corrected guide path with the selected drag error (S; $S_B$; $S_G$), and the geometry of the contour curve (UK).

12. The method according to claim 11, further comprising the step of reducing the speed of wire electrode when operating conditions including directional changes are encountered.

13. The method according to claim 11, wherein the drag error ($S_B$) is selected during the drag error acquisition, if the sensor signal ($s_d$) reaches a preset limit value with respect to at least one of oscillations, variance or standard deviation, for changing per unit time and/or to the absolute value of the sensor signal ($s_d$).

14. The method according to claim 13, wherein the measured drag error ($S_B$; $S_G$) is weighted differently if a combination of several measured drag errors ($S_B$; $S_G$) is selected.

15. A wire erosion machine with an actuating device for effecting movements of at least one guide head along at least one guide path (TD), comprising
   a) a plurality of devices for measuring a drag error (S; $S_B$; $S_G$) of a wire electrode; and
   b) a selector for selecting at least one of the drag error (S; $S_B$; $S_G$) from at least one of the plurality of devices.

16. The wire erosion machine according to claim 15, wherein the selector considers at least one of an at least one erosion parameter and an at least one sensor signal ($s_d$).

17. The wire erosion machine according to claim 16, wherein at least one of the plurality of devices is constructed such that it determines the drag error ($S_B$) in form of a drag error vector, as a vector quantity, from the instantaneous erosion parameters governing the erosion process.

18. The wire erosion machine according to claims 17, wherein the at least one of the plurality of devices is constructed such that it determines at least one of the magnitude of the drag error ($S_B$) from the erosion current (i(t)), the erosion voltage (u(t)) and the flushing pressure (p(t)).

19. The wire erosion machine according to claim 17, wherein the at least one of the plurality of devices is constructed such that it calculates from at least one of the erosion parameters and the geometry of the contour to be cut, represented by at least one contour curve (UK), the direction of the drag error ($S_B$), especially the angle α(x) between the drag error vector and the tangent in/at a point x of the contour curve (UK).

20. The wire erosion machine according to claim 15, wherein the at least one of the plurality of devices is constructed such that it calculates the instantaneous absolute value $|S_B(t)|$ of the drag error ($S_B$) from the instantaneous operating current i(t), the instantaneous operating voltage u(t) and the instantaneous flushing pressure p(t) according to the simplified formula $$|S_B(t)| = a^*i(t) + b^*p(t) + c^*u(t) + d$$

wherein a, b, c and d are predeterminable, in particular constant factors which can be determined experimentally or calculated from fixed parameters of the wire erosion machine and the workpiece.

21. The wire erosion machine according to claim 15, wherein the at least one of the plurality of devices is constructed such that it subdivides path elements of the contour curve (UK) into segments, wherein for each new segment of successive segments δx the angle δα is calculated according to the formula $$\delta\alpha(x) = (\pm 1/r_0 - \alpha(x)/x_0)^*\delta x,$$

wherein x is the running length of the section to be cut next, $x_0$ is a parameter which can be predetermined either experimentally or calculated from fixed parameters of the wire erosion machine, and $1/r_0$ is the curvature of the contour curve (UK), wherein $r_0$ and $x_0$ are calculated during the transition between the previous and the current path element.

22. The wire erosion machine according to claim 15, wherein at least one of the plurality of devices for measuring the drag error is constructed such that it calculates the angle α(x) between the drag error vector and the tangent at the point x of the contour curve (UK) approximately according to the formula $$\alpha(x) = \alpha_0 + (\alpha_0 - \alpha_\infty)^*\exp(-x/x_0)$$

wherein $\alpha_0$ is the angle between the drag error vector and the tangent of the new cutting direction and $\alpha_\infty$ is the asymptotic angle reached for $x >> x_0$.

23. The wire erosion machine according to claim 22, wherein the at least one of the plurality of devices is constructed such that it determines the parameter $x_0$ from the relation $$\alpha_\infty = x_0/r_0.$$

24. The wire erosion machine according to claim 23, further comprising at least a sensor device for measuring the relative position of the cutting wire with respect to the guide heads for generating at least one sensor signal ($s_d$).

25. The wire erosion machine according to claim 15, wherein
   the selector conveys the drag error (S; $S_B$; $S_G$) governing the erosion process to an interpolator; and
   the interpolator determines the corrected guide path based on at least one of the drag error (S; $S_B$; $S_G$) and the geometry of the contour curve (UK).

26. The wire erosion machine according to claim 15, further comprising a numerical controller for reducing the cutting speed when difficult operating conditions are encountered.

27. The wire erosion machine according to claim 25, wherein at least one of the plurality of devices for measuring a drag error, the selector and the interpolator are realized by implementing respective computer programs in at least one computer.

28. The wire erosion machine according to claim 15, wherein the selector is connected to a first of the plurality of devices for measuring a drag error such that the drag error ($S_B$) generated is switches through by the selector upon the sensor signal ($s_d$) meets preset criteria.

29. The wire erosion machine according to claim 28, wherein the preset criteria are one of limits of oscillations, variance or standard deviation, changes per unit time and changes of magnitude of the sensor signal ($s_d$).

30. The wire erosion machine according to claim 15, wherein the settling device moves the workpiece.

* * * * *

UNITED STATES PATENT AND TRADEMARK OFFICE
CERTIFICATE OF CORRECTION

PATENT NO. : 5,935,456
DATED : August 10, 1999
INVENTOR(S) : Andreas Braunschweiler, et al.

It is certified that error appears in the above-identified patent and that said Letters Patent is hereby corrected as shown below:

On the title page, item [73] Assignee, please correct the city of residence "LONSONE" to --LOSONE--.

Signed and Sealed this

Twenty-second Day of August, 2000

Attest:

Q. TODD DICKINSON

*Attesting Officer*  *Director of Patents and Trademarks*